US008821247B2

(12) United States Patent
Schulzke et al.

(10) Patent No.: US 8,821,247 B2
(45) Date of Patent: Sep. 2, 2014

(54) ONLINE GAMING WITH EMBEDDED REAL WORLD MONETARY WINS VIA LOTTERIES AND SKILL-BASED WAGERING

(75) Inventors: Ken Schulzke, Winnipeg (CA); Cameron Adams, Kamloops (CA); Eric Roy, Moncton (CA); George Rassias, Toronto (CA); Jason Lam, Vancouver (CA); Louis-Philippe Lussier, Moncton (CA); Serge Roy, St-Joseph-du-Lac (CA); Todd Heintz, Vancouver (CA)

(73) Assignee: Inerprovincial Lottery Corporation, Toronto (CA)

( * ) Notice: Subject to any disclaimer, the term of this patent is extended or adjusted under 35 U.S.C. 154(b) by 0 days.

(21) Appl. No.: 13/345,908

(22) Filed: Jan. 9, 2012

(65) Prior Publication Data

US 2012/0178514 A1 Jul. 12, 2012

Related U.S. Application Data

(60) Provisional application No. 61/492,702, filed on Jun. 2, 2011, provisional application No. 61/492,644, filed on Jun. 2, 2011, provisional application No. 61/430,889, filed on Jan. 7, 2011.

(51) Int. Cl.
*A63F 13/00* (2014.01)

(52) U.S. Cl.
USPC .................... 463/17; 463/25; 463/29; 463/42

(58) Field of Classification Search
USPC .......................................... 463/17, 25, 29, 42
See application file for complete search history.

(56) References Cited

U.S. PATENT DOCUMENTS

| | | | | |
|---|---|---|---|---|
| 2003/0027640 | A1 * | 2/2003 | Jeffway et al. | 463/49 |
| 2003/0114211 | A1 | 6/2003 | White | |
| 2007/0082725 | A1 | 4/2007 | Low et al. | |
| 2007/0124239 | A1 | 5/2007 | Jung et al. | |
| 2008/0064488 | A1 * | 3/2008 | Oh | 463/25 |
| 2008/0108410 | A1 * | 5/2008 | Baerlocher | 463/20 |
| 2009/0170608 | A1 * | 7/2009 | Herrmann et al. | 463/42 |
| 2009/0319363 | A1 * | 12/2009 | Callaghan et al. | 705/14.36 |
| 2010/0022290 | A1 * | 1/2010 | Oakes et al. | 463/17 |
| 2010/0267437 | A1 * | 10/2010 | Ansari et al. | 463/16 |

FOREIGN PATENT DOCUMENTS

| | | |
|---|---|---|
| WO | WO2011/109454 | 9/2011 |
| WO | WO2011/148148 | 12/2011 |

OTHER PUBLICATIONS

International Search Report dated Apr. 3, 2012 issued by the International Bureau (WIPO) in connection with the corresponding International Patent Application No. PCT/CA2012/050008.

* cited by examiner

*Primary Examiner* — James S McClellan
(74) *Attorney, Agent, or Firm* — Norton Rose Fulbright Canada LLP

(57) ABSTRACT

There is described herein an interactive game having both lotterized and skill-based wagering aspects embedded therein. A skill-based game is used to provide players with the challenge and entertainment value that they are accustomed to experiencing in popular mobile games, while adding the possibility of collecting real world winnings via lotteries and other forms of wagering.

29 Claims, 14 Drawing Sheets

| NAME | TYPE | DAMAGE | COST |
|---|---|---|---|
| **STONE AGE** | | | |
| SPEAR | FOCUSED | MEDIUM | LOW |
| BOULDER | WIDE AREA | LOW | MEDIUM |
| FLAMING ARROW VOLLEY | SUPER WEAPON | HIGH | HIGH |
| **BRONZE AGE** | | | |
| BALLISTA | FOCUSED | MEDIUM | LOW |
| CATAPULT | WIDE AREA | LOW | MEDIUM |
| FLAMING CATAPULT | SUPER WEAPON | HIGH | HIGH |
| **MIDDLE AGE** | | | |
| CANNON | FOCUSED | MEDIUM | LOW |
| TREBUCHET | WIDE AREA | LOW | MEDIUM |
| HUGE CANNON | SUPER WEAPON | HIGH | HIGH |
| **WWII AGE** | | | |
| ARTILLERY | FOCUSED | MEDIUM | LOW |
| MORTAR | WIDE AREA | LOW | MEDIUM |
| AIR STRIKE | SUPER WEAPON | HIGH | HIGH |
| **FUTURE** | | | |
| LASER | FOCUSED | MEDIUM | LOW |
| PROTON MISSILE | WIDE AREA | LOW | MEDIUM |
| ORBITAL STRIKE | SUPER WEAPON | HIGH | HIGH |

FIGURE 7

| NAME | TYPE | HEALTH |
|---|---|---|
| **STONE AGE** | | |
| MUD HUT | BASIC | LOW |
| MUD LONGHOUSE | ADVANCED | MEDIUM |
| CAVE | FORTRESS | HIGH |
| **BRONZE AGE** | | |
| STONE HUT | BASIC | LOW |
| STONE HOUSE | ADVANCED | MEDIUM |
| FORT | FORTRESS | HIGH |
| **MIDDLE AGE** | | |
| RAMPARTS | BASIC | LOW |
| TOWER | ADVANCED | MEDIUM |
| CASTLE | FORTRESS | HIGH |
| **WWII AGE** | | |
| TRENCH | BASIC | LOW |
| CROW'S NEST | ADVANCED | MEDIUM |
| BUNKER | FORTRESS | HIGH |
| **FUTURE** | | |
| POD | BASIC | LOW |
| POD CLUSTER | ADVANCED | MEDIUM |
| FORCE FIELD POD CLUSTER | FORTRESS | HIGH |

FIGURE 8

ONLINE GAMING WITH EMBEDDED REAL WORLD MONETARY WINS VIA LOTTERIES AND SKILL-BASED WAGERING

CROSS-REFERENCE TO RELATED APPLICATIONS

The present application claims priority under 35 USC 119(e) of U.S. Provisional Patent Application No. 61/492,702, filed on Jun. 2, 2011, U.S. Provisional Patent Application No. 61/492,644, filed on Jun. 2, 2011, and U.S. Provisional Application No. 61/430,889, filed on Jan. 7, 2011, the contents of which are hereby incorporated by reference.

TECHNICAL FIELD

The present invention relates to the field of online gaming and more particularly, to online gaming incorporating a lotterized and/or wagering aspect therein.

BACKGROUND OF THE ART

An online game is a game played over some form of a computer network, such as the Internet. The expansion of online gaming has reflected the overall expansion of computer networks from small local networks to the Internet and the growth of Internet access itself. Online games can range from simple text based games to games incorporating complex graphics and virtual worlds populated by many players simultaneously. Many online games have associated online communities, making online games a form of social activity beyond single player games.

A lottery is a form of gambling which involves the drawing of lots for a prize and it may come in various formats. For example, the prize can be a fixed amount of cash or goods. Alternatively, the prize may be a fixed percentage of the receipts, such as a “50-50” draw, where the prize is 50% of the revenue.

Other types of gambling games are those where money is staked on the outcome of a game at least partly based on skill, such as poker, blackjack, and billiards.

The demographics targeted and attracted to online games vs. lottery games vs. other types of gambling games vary widely. Providers of such games are always looking for ways to increase the population segments that will show an interest in either type of game.

SUMMARY

There is described herein an interactive game having both lotterized and skill-based wagering aspects embedded therein. A skill-based game is used to provide players with the challenge and entertainment value that they are accustomed to experiencing in popular mobile games, while adding the possibility of collecting real world winnings via lotteries and other forms of wagering.

In accordance with a first broad aspect, there is provided a system for executing an interactive video game having a lotterized component and a skill-based wagering component, the system comprising: at least one computer server communicable with at least one client computing device over a network, the server having a processor and a memory; a gaming engine module stored on the memory and executable by the processor, the gaming engine module having program code that when executed, generates an interactive game play instance playable on the client computing device; a lottery services module stored on the memory and executable by the processor, the lottery services module having program code that when executed, conducts a real world lottery transaction within the game play instance; and a skill-based wagering module stored on the memory and executable by the processor, the skill-based wagering module having program code that when executed, manages wagers placed on an outcome of the game play instance for a chance to win real world money, the outcome being at least partially determined on the basis of player skill.

In one embodiment the game play instance is playable in a single player mode and in a multi-player mode, the real world lottery transaction is performed within the game play instance in the single player mode, and the wagered virtual currency is allotted to a winner of the game play instance in the multi-player mode. In an alternative embodiment, the lotterized component and the skill-based component are both available in single player mode and multi-player mode.

In accordance with a second broad aspect, there is provided a computer-implemented method for providing an interactive video game having a lotterized component and a skill-based wagering component, the method comprising executing on a processor program code for: generating an interactive game play instance playable on a client computing device; conducting a real world lottery transaction within the game play instance; and managing wagers on the outcome of the game play instance for a chance to win real world money, the outcome being at least partially determined on the basis of player skill.

In accordance with another broad aspect, there is provided a computer readable medium having stored thereon program code executable by a processor for providing an interactive video game having a lotterized component and a skill-based wagering component, the program code executable for: generating an interactive game play instance playable on a client computing device; conducting a real world lottery transaction within the game play instance; and managing wagers on the outcome of the game play instance for a chance to win real world money, the outcome being at least partially determined on the basis of player skill.

In this specification, the term “credits” is intended to mean a virtual currency used in a virtual world to purchase virtual items, without possibility for conversion to a real world currency. The term “tokens” refers to a virtual currency applicable in a virtual world in a wagering scenario (lottery or other types of wagering) to win real world prizes. The term “win opportunities” refers to instant chances to win a real world prize via a lottery or other type of wagering game, and/or future chances to enter a draw to win a real world prize. The term “lottery” refers to a draw with a randomly or pseudo-randomly determined outcome. The term “skill-based wager” is used for gambling games where the outcome is at least partly skill-based.

BRIEF DESCRIPTION OF THE DRAWINGS

Further features and advantages of the present invention will become apparent from the following detailed description, taken in combination with the appended drawings, in which:

FIG. 7 is an exemplary table of suggested weapons available per level;

FIG. 8 is an exemplary table of suggested fortifications available per level;

It will be noted that throughout the appended drawings, like features are identified by like reference numerals.

DETAILED DESCRIPTION

Figure 1:
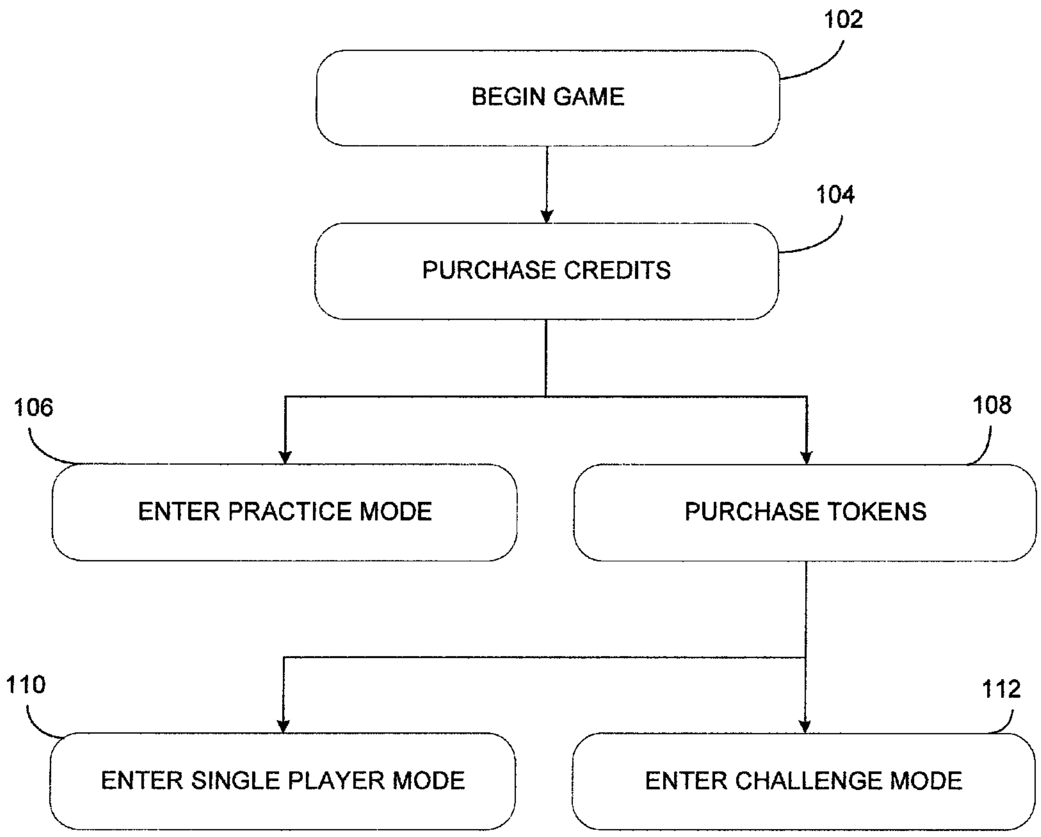
FIG. 1 is a flowchart illustrating the available modes for the game, in accordance with one embodiment.

There is described herein an interactive online game that may be a turn-based game of skill and strategy. Players attack each other and strategically place fortifications to protect their own base from attack. Each player takes turns attacking an opponent and the victor wins a portion of the opponent's resources.

When the player begins the game 102, he is asked to purchase credits 104. Credits are a virtual currency used to purchase elements necessary to play the game, such as fortifications and weapons. Credits cannot be converted into real dollars and have a value only in the virtual world of the game. With credits, the player may choose to enter practice mode 106 or to purchase tokens 108.

Practice mode is a reduced form of the game used to give the player an idea of what game play is like and how the lotterized aspects are embedded in the game, without providing the lotterized aspects. Various other restrictions may be imposed on the practice mode version of the game, such as limited play time, limited graphics, limited elements available for purchase, etc.

Tokens are a virtual currency different from credits in that they are used for the lotterized aspects of the game. They may be converted to real dollars at an exchange rate set by the game operator. In some embodiments, a predetermined amount is subtracted from a pot of tokens and the remaining amount is allotted to the winning player. Tokens are required in order to play the full version of the game, either in single player mode 110 or in challenge mode 112 (also referred to as multi-player mode).

Figure 2:
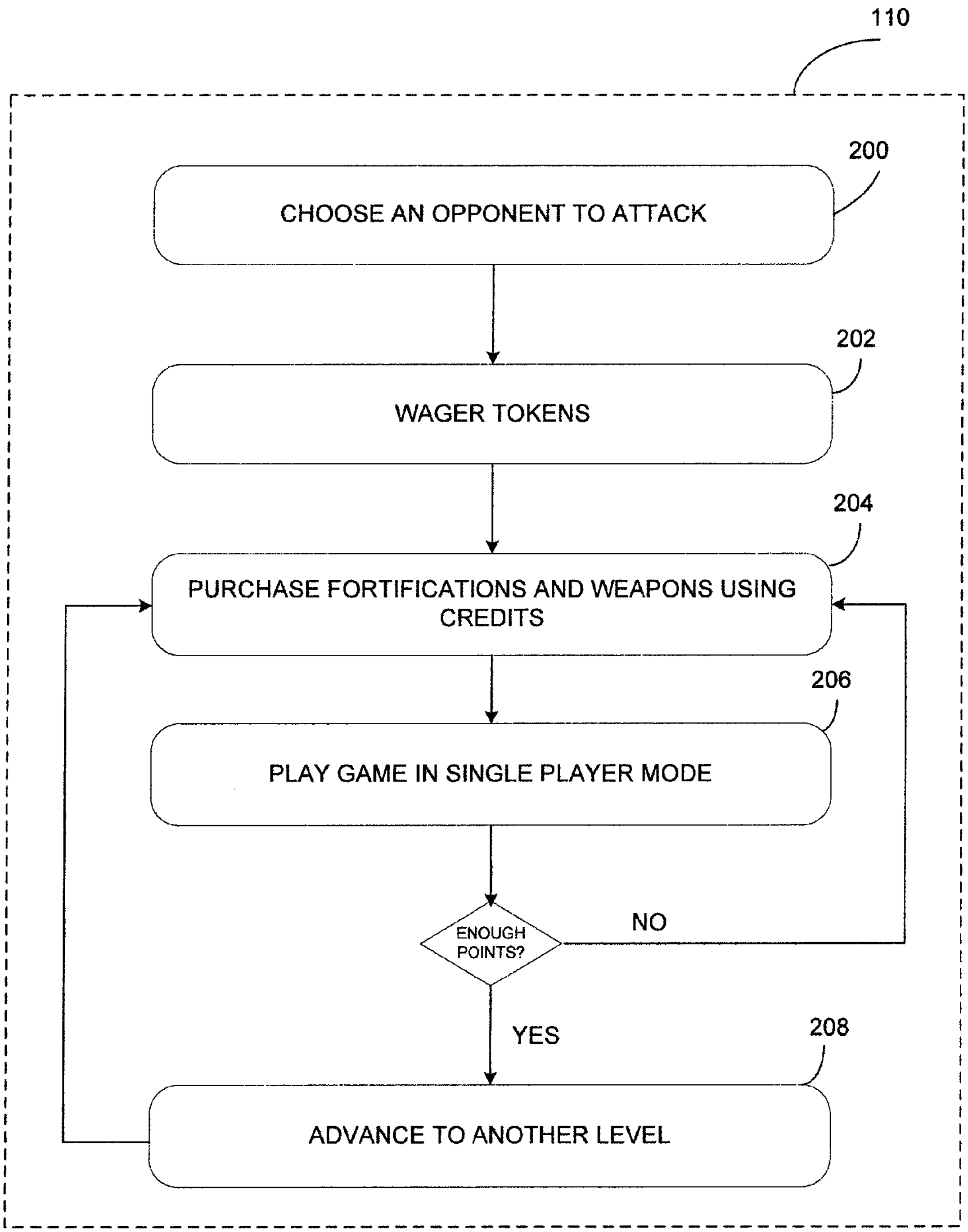
FIG. 2 is a flowchart illustrating an exemplary game play in single player mode.

Single player made 110 is illustrated in the flow chart of FIG. 2 in accordance with one embodiment. The player begins by choosing an opponent from a list as its target for an attack 200. The list may be composed of real players and/or virtual players. In either case, a computer may be representing the opponent, even if a real player is selected.

Before beginning the actual game, a given amount of tokens are wagered 202. The amount required may be set by the game operator or the player may be given free reign to select an amount to wager. In yet another embodiment, the amount wagered may be selected from a list of fixed amounts, such as 5 tokens, 10 tokens, and 15 tokens. The amount wagered may impact the potential winnings from the lotterized aspect of the game. For example, a wager of 5 tokens may result in a potential gain of 15 tokens, while a wager of 10 tokens may result in a potential gain of 25 tokens.

Once wagering has been settled, the player may purchase fortifications and weapons to play the game 204 using the credits previously purchased. The rules and regulations guiding this purchase and how the elements are used are dictated by the rules of the game. Changes in the rules of the game may impact how these elements are purchased, which types of elements are available, and how they are used within the game.

Figure 3:
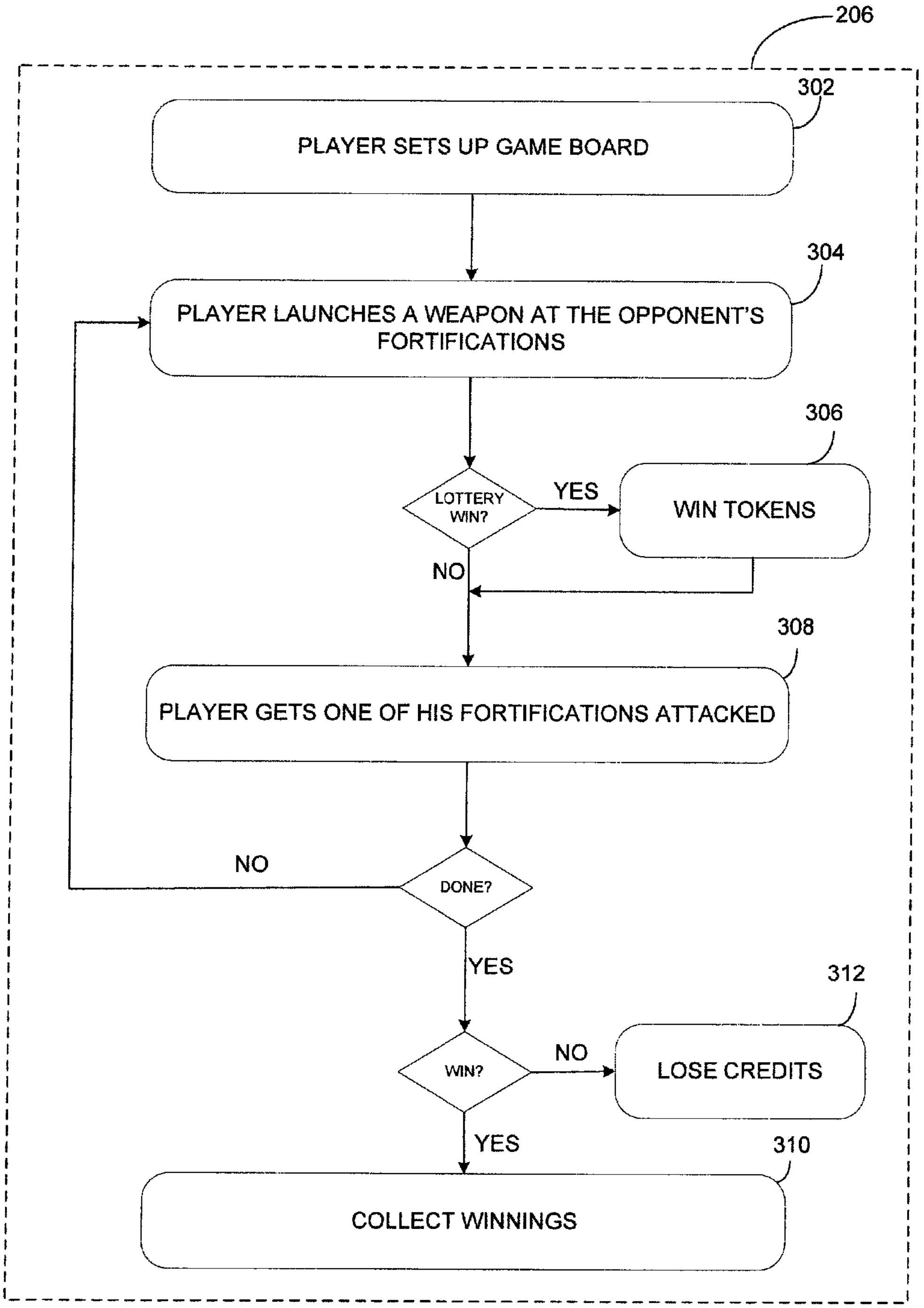
FIG. 3 is a flowchart illustrating an exemplary battle in single player mode.

The player may then participate in the actual game 206. Exemplary game play for single player mode is illustrated in FIG. 3. The player begins by setting up a game board 302. For this exemplary game, setting up the game board consists in setting up a defense. The purchased fortifications and weapons are set out in a strategic configuration for optimal protection. A weapon is hidden in each fortification. The player may see the game board in a 2D or 3D view. In one embodiment, a zoomed out view is 2D while a zoomed in view is 3D. The player may move from 2D to 3D using a two finger expand gesture, as commonly used for touch screen devices.

A timer may be used to indicate how long the player has to complete his set-up. Once the time expires, the game transitions to an attack or defense screen. When in attack mode, the player must launch a weapon at one of the opponent's fortifications 304. A timer may again be used to limit the time available to the player to launch the weapon. In this case, if the player fails to launch a weapon before the time expires, he forfeits his turn. The timer is used as a means to keep the player engaged in the game and also discourages the player from leaving a game that he is losing.

In single player mode, the lotterized aspects are embedded at this stage of the game. In any one game, the player has a given number of attacks available. For example, in one embodiment, the player is allowed six attacks on his opponent, and the opponent will attack the player six times. Any one of the six attacks launched by the player may result in a lotterized win. The game operator may randomly allocate a lottery win to any one of the launches. Alternatively, more than one launch may result in a lottery win. Lottery wins are independent of the skill of the player as the decision regarding which launch is a lottery win and which launch is not a lottery win is made arbitrarily. Therefore, any launch made by the player may result in winning tokens 306.

After the player launches a weapon, the opponent launches a weapon aimed at the player's fortifications 308. As indicated above, the opponent is controlled by a computer in single player mode. The player and the computer take turns launching their weapons until there are no more weapons or until one of the two has destroyed all of the fortifications of the other. If the player wins, then he may collect his winnings 310. In the case of a loss, no winnings are earned and in some instances, credits may even be lost 312. The tokens won by the player during the lotterized aspects of the game may be independent from the outcome of the game. A launch that results in a miss may be a lotterized win, and the player may have obtained one or more lotterized wins and still have lost the battle. In some instances, the tokens wagered before the game in order to play may result in tokens winnings if the player wins the game. Alternatively, these tokens are simply lost and are considered a cost of playing the game.

Referring back to FIG. 2, once the game is over, the player may move on to a next level 208 if the criteria for advancing have been met. For example, the criteria for advancing to another level may be anyone of a given number of credits won, a given number of battles/games won, a given number of experience points acquired during a battle/game, etc. Experience points are earned by participating in a battle and destroying an opponent's fortifications. Therefore, the overall battle may be lost but the number of experience points acquired may allow the player to advance to the next level. Experience points may also provide access to new fortifications and weapons, as will be discussed in more detail below.

In one embodiment, the attack of the player on the opponent in single player mode has an impact on the opponent's game, even though they do not actively participate in the battle. When selected as an opponent, the player on the receiving end of the attack is likely not in the game and possibly not even online. For this reason, they may not be aware that they are being attacked. However, when logging into the game after the attack, the opponent will then realize that he or she has been attacked and that some damage has been incurred. If desired, the game operator may set the game so that the damage incurred by an attack from a player in single player mode is far less substantial than the damage incurred by the player when participating actively in the game in challenge mode. In this embodiment, the game still progresses, even when the player is not actively battling opponents.

Figure 4:
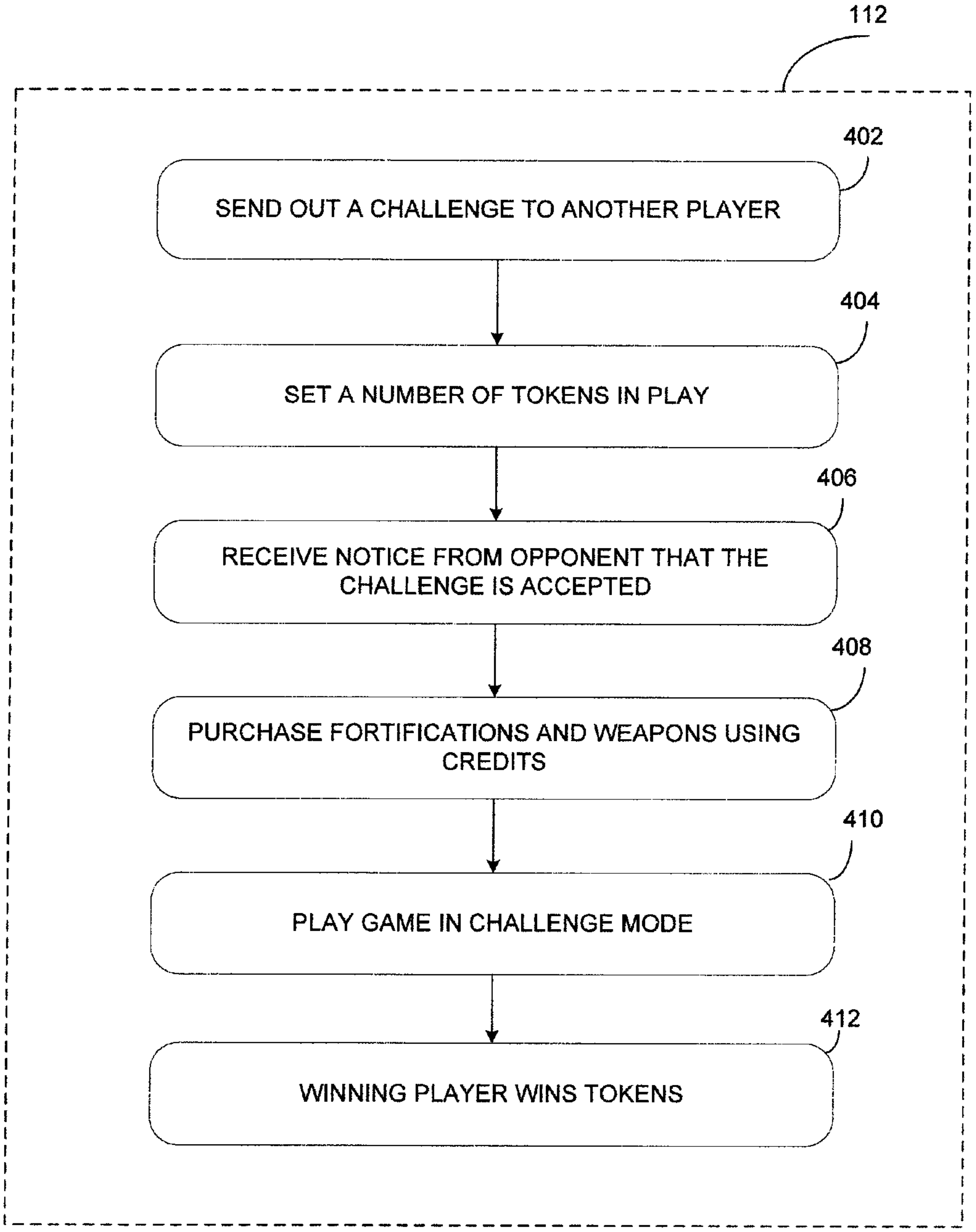
FIG. 4 is a flowchart illustrating an exemplary game play in challenge mode.

FIG. 4 is a flowchart illustrating challenge mode 112 in accordance with one embodiment. Challenge mode refers to a mode where a player competes against at least one other player in real-time. The other player is selected from a list of available players. In one embodiment, this list may be limited to the player's "friends". In another embodiment, this list may be limited to other players who are at the same level in the game. Also alternatively, there may be no limit as to who the player may compete against. In addition, players may issue challenges to people not yet part of the game by inviting them through email, social networks, etc. Such invited players may then register prior to joining the game. This allows game operators to use the game mechanics as an acquisition tool to draw more players into the game.

Once the opponent selected, the player sends out a challenge to the other player(s) 402. In addition, the player indicates a wager in the form of tokens 404. This is the skill-based wagering aspect of the challenge mode as any winnings collected from this battle may be converted to real money, and the winner of the wager is determined by the outcome of the game. In some embodiments, skill-based wagering may also take place in single player mode, with the player battling the computer.

In challenge mode, the challenged player may receive an alert, such as a pop-up or notification, to join the game and match the challenger's stake. The challenged player may also suggest an alternate stake if the one proposed is too high or too low for him. Once the two agree on a wager, the challenger receives a notice that the challenge has been accepted 406. In this mode, winning real money is dependent at least in part on player skill and ability.

Figure 5:
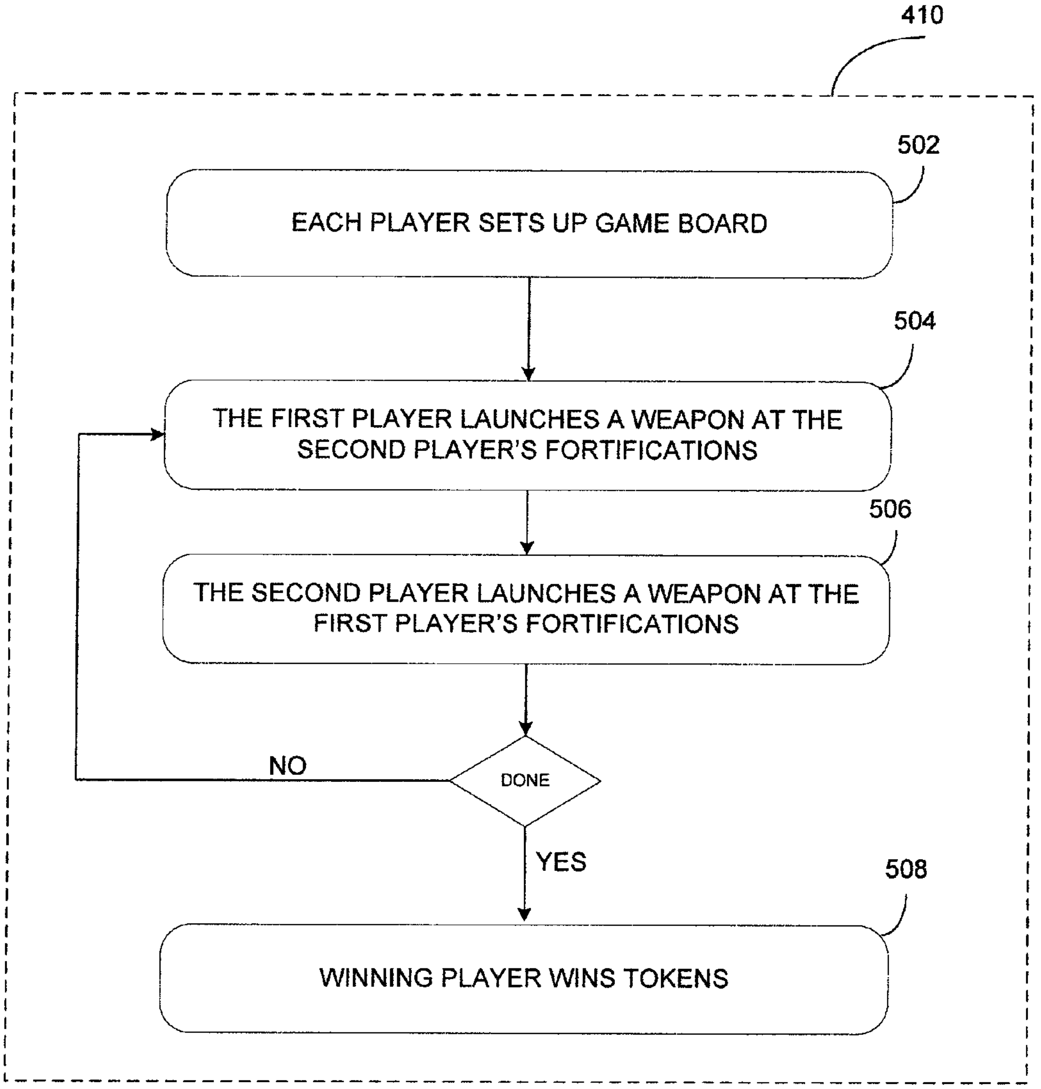
FIG. 5 is a flowchart illustrating an exemplary battle in challenge mode.

Similarly to single player mode, the players must each purchase fortifications and weapons using credits 408. They then play the game 410 and the winner obtains the tokens in play. FIG. 5 illustrates an exemplary game play for challenge mode 410. Also similarly to single player mode, each player sets up his game board 502 in a strategic manner. In one embodiment, the players start the game by playing a quick mini-game to determine who fires first. Each player attacks a single fortification of the opponent with a weapon of his choice and whoever deals the most damage can elect to go first or second. If both players tie, the challenged player is given the choice. Alternatively, a default player may be set to go first by the game operator, such as the challenger, the challengee, the player with the most experience points, the player who has reached the highest level in single mode play, etc. In yet another alternative, a player may surrender a given amount of tokens for the right to go first.

The first player launches a weapon at the second player's fortifications 504. This is followed by the second player launching a weapon at the first player's fortifications 506. These two steps are repeated until a winner emerges. In one embodiment, the challenge ends when one player's fortifications are entirely destroyed. Alternatively, the challenge ends when the players run out of weapons and the loser is the one with the greatest damage to his fortifications. In yet another alternative, the battle is time-limited and when time runs out, the loser is the one with the greatest damage to his fortifications. The winning player collects the wager of tokens 508.

In one embodiment, the lotterized aspect of the game found in single player mode may also be provided in challenge mode. For example, in addition to the potential winnings obtained by winning the battle, one or more of each player's weapon launches may result in a win opportunity via an instant lottery draw or an opportunity to participate in a future lottery draw. Other types of instant prizes may also be provided to the player via the lotterized win opportunities. In an alternative embodiment, the lotterized win opportunities are only available in single player mode.

In one embodiment, the players are each allotted a given amount of credits to buy armaments for the battle in challenge mode. These credits do not live beyond the scope of the challenge and are only used for this challenge. Alternatively, the players must use their own credits to purchase the elements necessary to participate in the battle.

In one embodiment, the players play at a randomly selected level. Alternatively, the level of one of the two players may dictate the level at which the challenge battle takes place. Also alternatively, the players may be allowed to select which level to play at. For example, this may be selected by the challenger at the time of sending the challenge and be part of the conditions of the challenge that are to be accepted by the player receiving the challenge.

Figure 6:
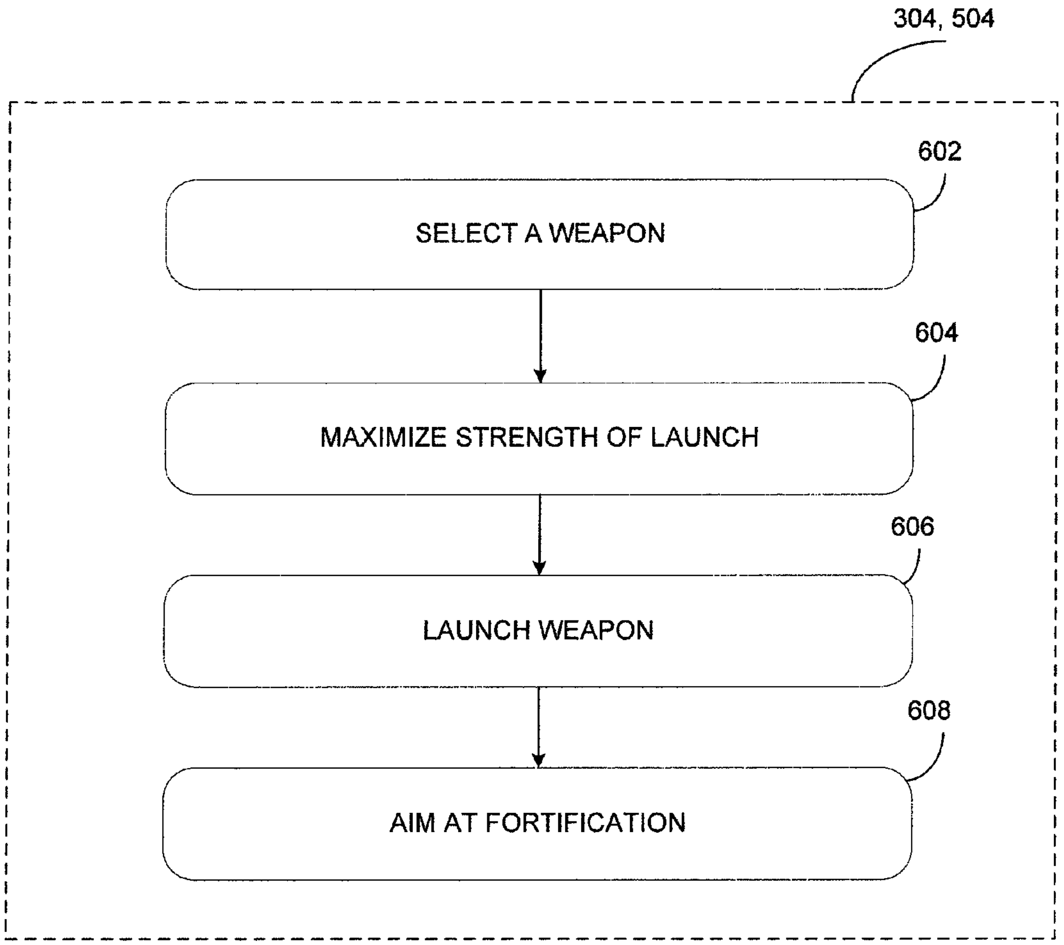
FIG. 6 is a flowchart illustrating an exemplary weapon launch, in either single player mode or challenge mode.

FIG. 6 illustrates an exemplary embodiment for launching a weapon at an opponent's fortifications 304, 504. In order to proceed with a launch, an individual weapon must be selected by the player. FIG. 7 illustrates an exemplary set of weapons available to a player for each level. In this example, the levels are characterized in terms of an era in history, such as stone age, bronze age, middle age, World War II, and the future. For each level, a set of weapons corresponding to the era are available to the player. The weapons will vary in number of credits required to purchase them (cost), type of damage caused, and degree of damage caused. For example, in the stone age, the player may choose from a spear, a boulder, and a flaming arrow volley. The spear offers a focused type of damage, meaning that damages are limited to a small area. However, the level of damage caused is medium and the cost is low. The boulder offers a wide area type of damage, but the damage level is low and the costs are medium. The flaming arrow volley is a super weapon, which means it is the most powerful weapon available. This weapon may be able to destroy any type of fortification in one hit, but the cost is high. In some embodiments, such a weapon is limited to one use per battle. Other exemplary weapons are listed in the table for the other suggested levels of the game.

At this stage of the game, the player will have already purchased a set of weapons. When setting up his game board, the player associates a given purchased weapon with a given purchased fortification. Each weapon is hidden from attack in a fortification. When the player selects a weapon for launch 602, he is choosing one of the weapons in one of the fortifications from his game set-up.

After selecting the weapon 602, the player may launch the weapon 606. In one embodiment, the strength of the launch is determined using a power bar. The player pulls down on the power bar 604 to maximize damage caused by the attack. Alternative methods of maximizing damage may also be provided, such as "purchasing" a damage level using a number of credits or tokens, and randomly assigning a power level to any given launch. Once the weapon has been launched 606, the screen changes from the player's own set-up to the opponent's set-up. The player must aim for a given fortification 608 on the opponent's set-up. In one embodiment, aiming is done using an accelerometer of the mobile device on which the player is playing the game. The accelerometer rotates on three different axes, namely x, y, and z. The weapon may be directed at a fortification by moving the mobile device in one or more axis, or by rotating the device about one or more axis. In an alternative embodiment, the player may use a pointer (such as a mouse) or his finger (on a touch screen) to select one of the opponent's fortifications.

FIG. 8 illustrates an exemplary set of fortifications available to a player for each level. In this example, the levels are again characterized in terms of an era in history. For each level, a set of fortifications corresponding to the era are available to the player. The fortifications will vary in number of credits required to purchase them (type) and the robustness or resistance to attacks (health). For example, in the stone age, the player may choose from a mud hut, a mud longhouse, and a cave. The mud but is a basic fortification, meaning that it is cheaper, and has a relatively low health. The mud longhouse is an advanced fortification, meaning that it costs more to obtain than the basic fortification, but it will also be more resistant. The cave is a fortress, which means it is the most expensive fortification available and it is the most resistant to attacks. In some embodiments, such a fortification is limited to one per battle. Other exemplary fortifications are listed in the table for the other suggested levels of the game. When a fortification is destroyed, the player also loses the weapon that was stored in it. While on defense, the player may see the opponent's attack timer and weapon launch, and the damage dealt to their own fortifications. Players are unable to see which of the opponent's weapons are in each fortification.

Figure 9:
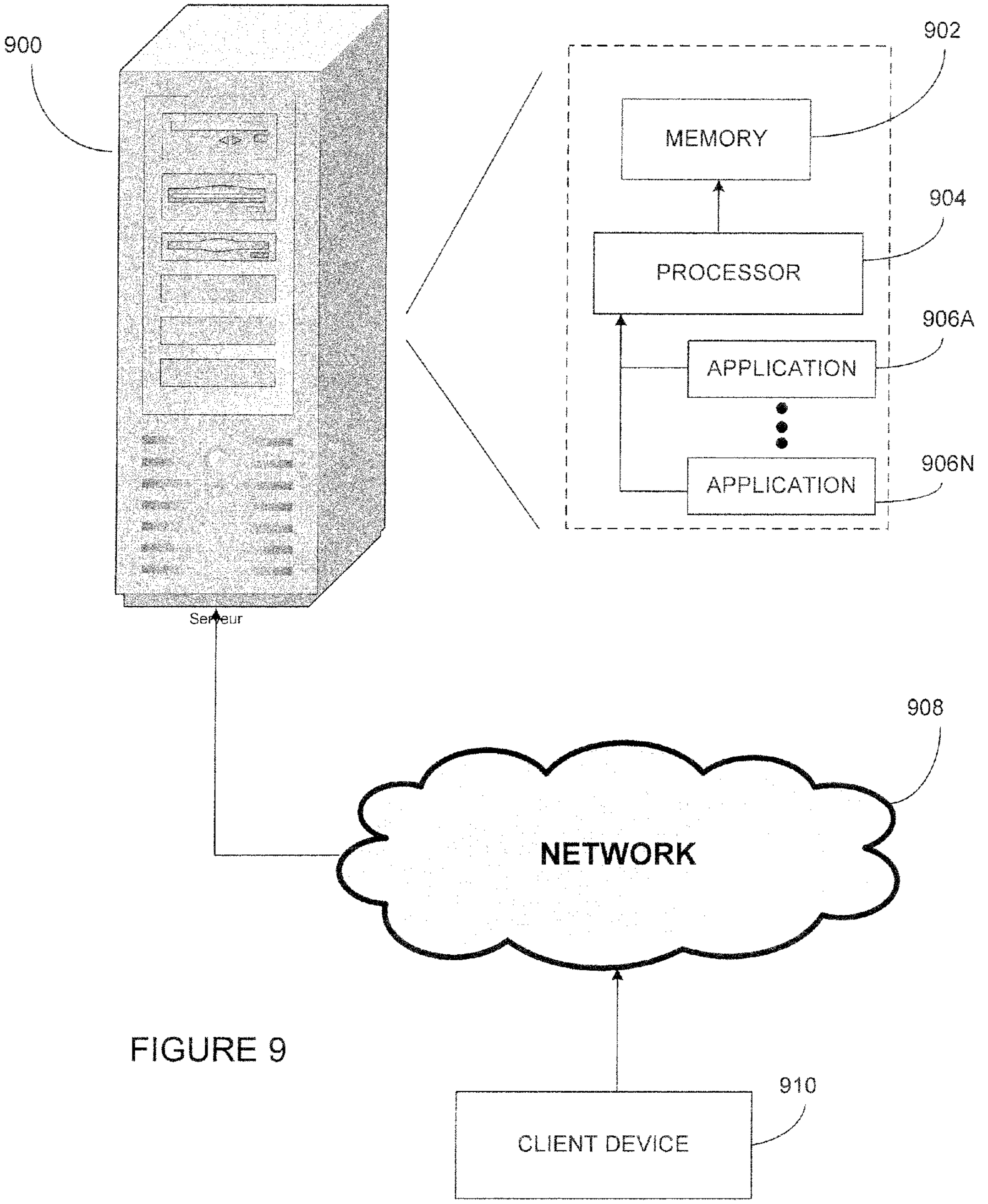
FIG. 9 is a schematic illustration of a system for executing an interactive video game, in accordance with one embodiment.

Referring to FIG. 9, there is illustrated a system for executing the interactive video game having lotterized and skill-based wagering components embedded therein. One or more server(s) are provided remotely and accessible via a network 908. For example, a series of servers corresponding to a web server, an application server, a database server, and a lottery server may be used. These servers are all represented by server 900 in FIG. 9. The server 900 is accessed by a client device 910, such as a telephone, a computer, a personal digital assistant (PDA), an iphone™, etc, via any type of network 908, such as the Internet, the Public Switch Telephone Network (PSTN), a cellular network, or others known to those skilled in the art.

The server 900 comprises, amongst other things, a plurality of applications 906*a* . . . 906*n* running on a processor 904, the processor being coupled to a memory 902. It should be understood that while the applications 906*a* . . . 906*n* presented herein are illustrated and described as separate entities, they may be combined or separated in a variety of ways.

One or more databases (not shown) may be integrated directly into memory 902 or may be provided separately therefrom and remotely from the server 900. In the case of a remote access to the databases, access may occur via any type of network 908, as indicated above. The various databases described herein may be provided as collections of data or information organized for rapid search and retrieval by a computer. They are structured to facilitate storage, retrieval, modification, and deletion of data in conjunction with various data-processing operations. They may consist of a file or sets of files that can be broken down into records, each of which consists of one or more fields. Database information may be retrieved through queries using keywords and sorting commands, in order to rapidly search, rearrange, group, and select the field. The databases may be any organization of data on a data storage medium, such as one or more servers.

In one embodiment, the databases are secure web servers and Hypertext Transport Protocol Secure (HTTPS) capable of supporting Transport Layer Security (TLS), which is a protocol used for access to the data. Communications to and from the secure web servers may be secured using Secure Sockets Layer (SSL). An SSL session may be started by sending a request to the Web server with an HTTPS prefix in the URL, which causes port number "443" to be placed into the packets. Port "443" is the number assigned to the SSL application on the server. Identity verification of a user may be performed using usernames and passwords for all users. Various levels of access rights may be provided to multiple levels of users.

Alternatively, any known communication protocols that enable devices within a computer network to exchange information may be used. Examples of protocols are as follows: IP (Internet Protocol), UDP (User Datagram Protocol), TCP (Transmission Control Protocol), DHCP (Dynamic Host Configuration Protocol), HTTP (Hypertext Transfer Protocol), FTP (File Transfer Protocol), Telnet (Telnet Remote Protocol), SSH (Secure Shell Remote Protocol), POP3 (Post Office Protocol 3), SMTP (Simple Mail Transfer Protocol), IMAP (Internet Message Access Protocol), SOAP (Simple Object Access Protocol), PPP (Point-to-Point Protocol), RFB (Remote Frame buffer) Protocol.

The memory 902 accessible by the processor 904 receives and stores data. The memory 902 may be a main memory, such as a high speed Random Access Memory (RAM), or an auxiliary storage unit, such as a hard disk, a floppy disk, or a magnetic tape drive. The memory may be any other type of memory, such as a Read-Only Memory (ROM), or optical storage media such as a videodisc and a compact disc.

The processor 904 may access the memory 902 to retrieve data. The processor 904 may be any device that can perform operations on data. Examples are a central processing unit (CPU), a front-end processor, a microprocessor, a graphics processing unit (GPU/VPU), a physics processing unit (PPU), a digital signal processor, and a network processor. The applications 906*a* . . . 906*n* are coupled to the processor 904 and configured to perform various tasks as explained below in more detail. An output may be transmitted to the client device 910.

Figure 10:
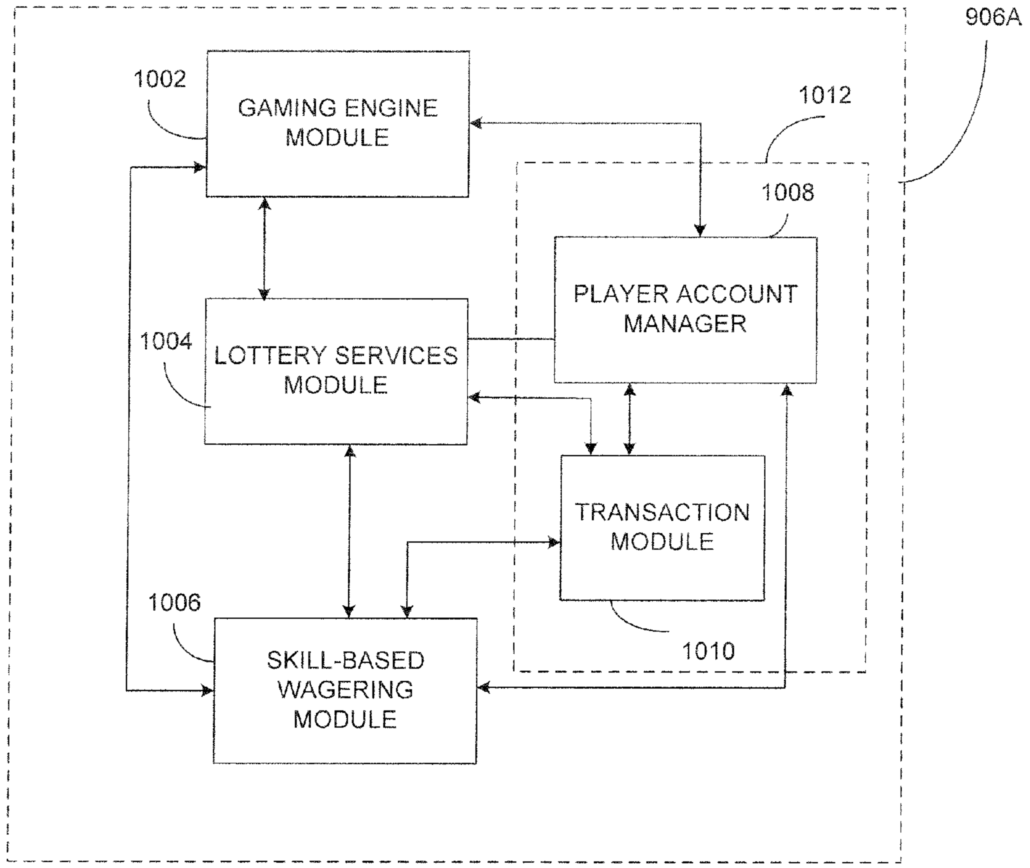
FIG. 10 is a block diagram illustrating an exemplary application running on the processor of the system of FIG. 9.

FIG. 10 illustrates an exemplary application 906*a* running on the processor 904, The application 906*a* comprises at least a gaming engine module 1002, a lottery services module 1004, and a skill-based wagering module 1006. These three modules interact together in order to provide the interactive video game that is executable by the processor 904 over the network 908. The interactive video game can conduct a lottery transaction within an interactive game play instance which issues a real lottery ticket from a government sanctioned lottery authority. It can also stake a wager between two players competing against each other in the interactive game play instance, the winner collecting the wagered amount, the winnings being convertible to real world currency.

A management module 1012 is illustrated as comprising a player account manager 1008 and a transaction module 1010. The transaction module 1010 is involved in the real world transactional aspects of the game. Real world transactions are involved when players purchase virtual currencies and when players are awarded cash or other real world prizes via the integrated lotteries and wagering. Therefore, the transaction module 1010 interacts with the lottery services module 1004 and the skill-based wagering module 1006 to manage the transactions. The transaction module 1010 also interacts with the player account manager 1008. The player account manager 1008 is responsible for managing player account functions, such as creating a player account, validating an existing player's login and password or a new player's eligibility to play the game, suspending a player's account, activating a player account, creating a player profile, viewing a player profile, viewing a current balance of a player's real money in a player account, updating a current balance of a player's real money account, and updating a player's virtual ranking/status.

Figure 11:
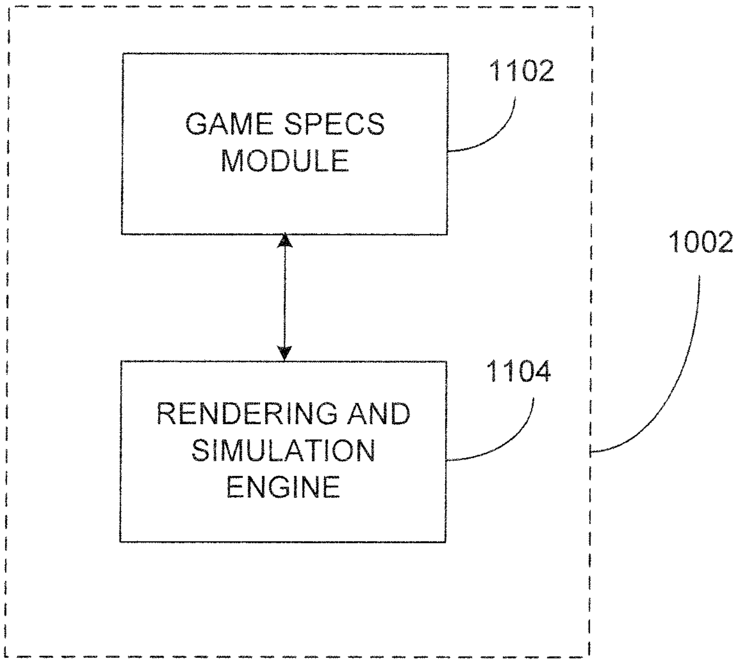
FIG. 11 is a block diagram illustrating an exemplary gaming engine module for the application of FIG. 10.

The gaming engine module 1002 is a flexible and reusable software platform which provides core functionalities needed to develop a game application. This module may be responsible for all aspects of the lotterized video game that relate directly to the interactive game, namely the battles. FIG. 11 is a simplified block diagram of an exemplary embodiment of the gaming engine module 1002. A game specs module 1102 contains specific gaming logic and instructs a rendering and simulation engine 1104 to create the virtual world and render images in accordance with this logic. For example, if a player finishes a first level and wishes to continue to a second level, the game specs module 1102 will instruct the rendering and simulation engine 1104 to display the items available in the second level of the game for the user to purchase. In another example, when a given action occurs in a game, such as the player launching a given weapon, the game specs module 1102 will instruct the rendering and simulation engine 1104 to render the appropriate graphics and display these graphs within the simulated gaming environment. For simplicity, other features of the gaming engine module 1002 typically present in such a software platform are not illustrated. Examples of these other features relate to functionalities such as collision detection (and collision response), sound, scripting, animation, artificial intelligence, networking, streaming, memory management, threading, localization support, and a scene graph. These functionalities will be readily understood to be included in the present description by a person skilled in the art.

Figure 12:
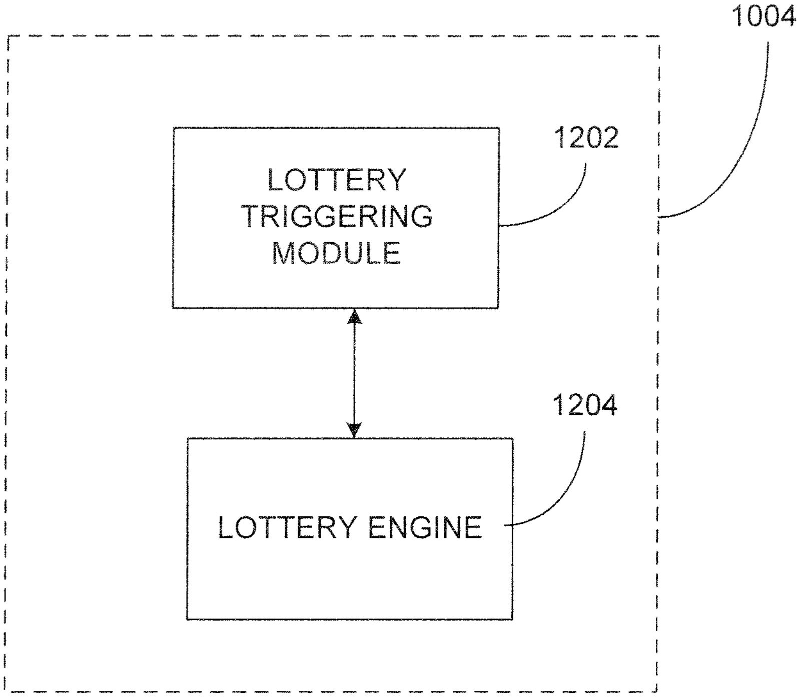
FIG. 12 is a block diagram illustrating an exemplary lottery services module for the application of FIG. 10.

The lottery services module 1004 is responsible for all aspects of the lotterized video game that relate directly to the lotterized features incorporated into the interactive game. FIG. 12 is a simplified exemplary embodiment of the lottery services module 1004. A lottery triggering module 1202 manages the real world lotteries run during the interactive video game and cooperates with a lottery engine 1204, which is responsible for the actual draws and validating of wins.

Figure 13:
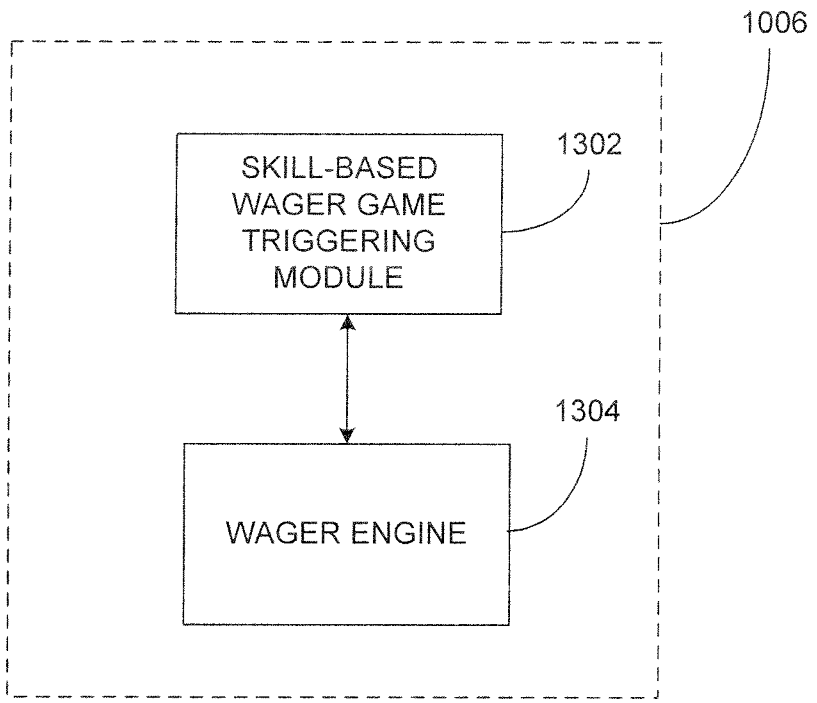
FIG. 13 is a block diagram illustrating an exemplary wagering module for the application of FIG. 10.

FIG. 13 is a simplified exemplary embodiment of the wagering module 1006. A skill-based wagering game triggering module 1302 manages the wagers that are placed by players when in challenge mode. A wager engine 1304 is responsible for locking in the wager once the challenge has been accepted and allocating the winnings to the winner of the battle.

Figure 14:
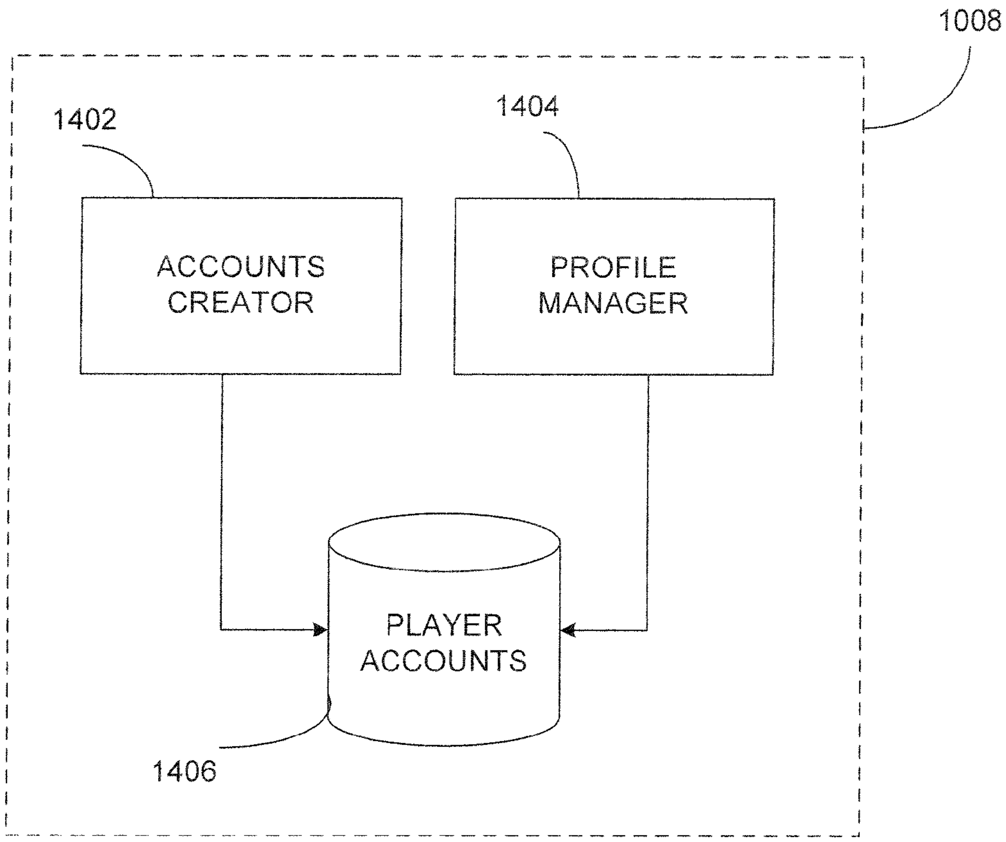
FIG. 14 is a block diagram illustrating an exemplary player account manager for the application of FIG. 10.

FIG. 14 illustrates in more detail the player account manager 1008 of FIG. 10. An accounts creator 1402 handles the creation of the account, acquisition of personal information of the player, acquisition of financial information of the player, and the general creation of a player profile. The player accounts/profiles are maintained in a database 1406 and updated by a profile manager 1404. The profile manager 1404 will update the player accounts 1406 whenever new information is available for a player. The new information may have to do with game statistics, updated personal information, updated financial information, leader board data, prizes won, etc.

The following is an exemplary description of the interaction of the various modules of FIGS. 9 to 14 in accordance with game play. When a player launches application 906*a* on his client device 910, the player account manager 1008 will either set up a new account for a new player or access an existing account for an existing player. In the case of a new player, various required information is obtained from the player and recorded in the player account database 1406.

To start a new game, the player must purchase virtual currency. The transaction module 1010 will perform a financial transaction and issue the requested virtual currency. The player account database 1406 is updated with this new information once the virtual currency has been purchased.

As the player plays the video interactive game, the gaming engine module 1002 continues to provide the appropriate graphics, simulate various environments, and apply gaming logic to allow the player to progress in the game. When a win opportunity is presented, the lottery services module 1004 will perform lottery draws and award real world prizes accordingly. The transaction module 1010 will be involved in the transactional aspects of the lottery draws and the player account manager 1008 is updated with any new information to the player's account. When a wager is placed on the outcome of a game, the wagering module 1006 manages the exchanges between the players to agree on the wager amount, locks in the wager amount, and allocates the winnings to the winner of the battle.

While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment.

It should be noted that the present invention can be carried out as a method, can be embodied in a system, a computer readable medium or an electrical or electro-magnetic signal. The embodiments of the invention described above are intended to be exemplary only. The scope of the invention is therefore intended to be limited solely by the scope of the appended claims.

The invention claimed is:

1. A system for executing an interactive video game having a lotterized component and a skill-based wagering component, the system comprising:

at least one computer server communicable with at least one client computing device over a network, the server having a processor and a memory;

a gaming engine module stored on the memory and executable by the processor, the gaming engine module having program code that when executed, generates an interactive game play instance playable on the client computing device, the game play instance including a skill-based battle between at least a first player and a second player;

a lottery services module stored on the memory and executable by the processor, the lottery services module having program code that when executed, conducts a real world lottery transaction within the game play instance; and a skill-based wagering module stored on the memory and executable by the processor, the skill-based wagering module having program code that when executed, manages wagers placed on an outcome of the game play instance for a chance to win real world money, the outcome being at least partially determined on the basis of player skill;

wherein conducting the real world lottery transaction within the game play instance includes generating a request for issuing a real world lottery ticket;

wherein the gaming engine module further comprises program code that when executed, generates the real lottery ticket request as a result of an action taken by at least one of the first player and the second player in the skill-based battle.

2. The system of claim 1, further comprising a management module stored on the memory and executable by the processor, the management module having program code that when executed, manages virtual credits used to purchase virtual items for the game play instance, tokens for wagering on the outcome of the game play instance, and real world currency used to purchase at least one of the virtual credits and the tokens.

3. The system of claim 1, wherein the gaming engine module further comprises program code that when executed, generates the interactive video game in a single player mode and in a multi-player mode.

4. The system of claim 3, wherein the gaming engine module further comprises program code that when executed, generates the game play instance as a skill-based battle between the first player and a computer in the single player mode, and the skill-based battle between the first player and another player in the multi-player mode.

5. The system of claim 3, wherein the gaming engine module further comprises program code that when executed, generates the game play instance as a skill-based battle between the first player and the second player in the single player mode, the second player corresponding to a real player not online and represented by a computer, and wherein the outcome of the skill-based battle has an impact on a game status of the second player.

6. The system of claim 4, wherein the lottery services module further comprises program code that when executed, generates a real lottery ticket by receiving a real lottery ticket transaction request within the game play instance.

7. The system of claim 1, wherein the lottery services module further comprises program code that when executed, sets a prize for the real world lottery transaction in accordance with the wager placed on the outcome of the game play instance.

8. The system of claim 1, wherein the lottery services module further comprises program code that when executed, allocates a prize for the real world lottery transaction independently from the outcome of the game play instance.

9. The system of claim 2, wherein the gaming engine module further comprises program code that when executed, presents an opportunity to purchase weapons and fortifications using the virtual credits, in order to set-up a game board.

10. The system of claim 9, wherein the gaming engine module further comprises program code that when executed, presents weapons that vary in cost, scope of damage, and degree of damage.

11. The system of claim 9, wherein the gaming engine module further comprises program code that when executed, presents fortifications that vary in cost and resistance to attack as a function of a type of weapon used.

12. The system of claim 9, wherein the gaming engine module further comprises program code that when executed, controls aiming of the weapons at the fortifications using an accelerometer that rotates on three axes.

13. The system of claim 12, wherein the gaming engine module further comprises program code that when executed, controls the accelerometer by receiving signals from the client computing device representative of physical movement thereof along the three axes.

14. The system of claim 1, wherein the lottery services module further comprises program code that when executed, generates a real lottery ticket issued from a government sanctioned lottery authority.

15. A computer-implemented method for providing an interactive video game having a lotterized component and a skill-based wagering component, the method comprising executing on a processor program code for:

generating an interactive game play instance playable on a client computing device, the game play instance including a skill-based battle between at least a first player and a second player;

conducting a real world lottery transaction within the game play instance; and managing wagers on the outcome of the game play instance for a chance to win real world money, the outcome being at least partially determined on the basis of player skill;

wherein conducting the real world lottery transaction within the game play instance includes generating a request for issuing a real world lottery ticket as a result of an action taken by at least one of the first player and the second player in the skill-based battle.

16. The computer-implemented method of claim 15, further comprising managing virtual credits used to purchase virtual items for the game play instance, tokens for wagering on the outcome of the game play instance, and real world currency used to purchase at least one of the virtual credits and the tokens.

17. The computer-implemented method of claim 15, wherein generating the interactive game play instance comprises generating the interactive video game in a single player mode and in a multi-player mode.

18. The computer-implemented method of claim 17, wherein generating the interactive game play instance comprises generating the game play instance as a skill-based battle between the first player and a computer in the single player mode, and the skill-based battle between the first player and another player in the multi-player mode.

19. The computer-implemented method of claim 17, wherein generating the interactive game play instance comprises generating the game play instance as a skill-based battle between the first player and the second player in the single player mode, the second player corresponding to a real player not online and represented by a computer, and wherein the outcome of the skill-based battle has an impact on a game status of the second player.

20. The computer-implemented method of claim 18, wherein conducting a real world lottery transaction comprises generating a real lottery ticket by receiving a real lottery ticket transaction request within the game play instance.

21. The computer-implemented method of claim 15, wherein conducting a real world lottery transaction comprises setting a prize for the real world lottery transaction in accordance with the wager placed on the outcome of the game play instance.

22. The computer-implemented method of claim 15, wherein conducting a real world lottery transaction comprises allocating a prize for the real world lottery transaction independently from the outcome of the game play instance.

23. The computer-implemented method of claim 16, wherein generating the interactive game play instance comprises presenting an opportunity to purchase weapons and fortifications using the virtual credits, in order to set-up a game board.

24. The computer-implemented method of claim 23, wherein presenting an opportunity to purchase weapons comprises presenting weapons that vary in cost, scope of damage, and degree of damage.

25. The computer-implemented method of claim 23, wherein presenting an opportunity to purchase fortifications comprises presenting fortifications that vary in cost and resistance to attack as a function of a type of weapon used.

26. The computer-implemented method of claim 23, wherein generating the interactive game play instance comprises controlling aiming of the weapons at the fortifications using an accelerometer that rotates on three axes.

27. The computer-implemented method of claim 26, wherein controlling aiming of the weapons at the fortifications using an accelerometer comprises receiving signals from the client computing device representative of physical movement thereof along the three axes.

28. The computer-implemented method of claim 15, wherein conducting a real world lottery transaction comprises generating a real lottery ticket issued from a government sanctioned lottery authority.

29. A non-transitory computer readable medium having stored thereon program code executable by a processor for providing an interactive video game having a lotterized component and a skill-based wagering component, the program code executable for:

generating an interactive game play instance playable on a client computing device, the game play instance including a skill-based battle between at least a first player and a second player;

conducting a real world lottery transaction within the game play instance; and managing wagers on the outcome of the game play instance for a chance to win real world money, the outcome being at least partially determined on the basis of player skill;

wherein conducting the real world lottery transaction within the game play instance includes generating a request for issuing a real world lottery ticket as a result of an action taken by at least one of the first player and the second player in the skill-based battle.

* * * * *

UNITED STATES PATENT AND TRADEMARK OFFICE

CERTIFICATE OF CORRECTION

PATENT NO. : 8,821,247 B2
APPLICATION NO. : 13/345908
DATED : September 2, 2014
INVENTOR(S) : Ken Schulzke et al.

It is certified that error appears in the above-identified patent and that said Letters Patent is hereby corrected as shown below:

In the Specification,

Column 3, line 56, “made” should read “mode”.

Column 4, line 67, “anyone” should read “any one”.

Column 5, line 38, “opponent selected” should read “opponent is selected”.

Column 8, line 56, “on the processor 904 The application 906a comprises at least” should read “on the processor 904. The application 906a comprises at least”.

Signed and Sealed this
Seventeenth Day of February, 2015

Michelle K. Lee

Michelle K. Lee
*Deputy Director of the United States Patent and Trademark Office*